United States Patent
Wang et al.

(10) Patent No.: US 11,817,973 B2
(45) Date of Patent: Nov. 14, 2023

(54) METHOD AND RECEIVING NODE FOR DETERMINING CHANNEL WINDOW LENGTH

(71) Applicant: Telefonaktiebolaget LM Ericsson (publ), Stockholm (SE)

(72) Inventors: Zhao Wang, Solna (SE); Efthymios Stathakis, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 131 days.

(21) Appl. No.: 17/419,038

(22) PCT Filed: Jan. 4, 2019

(86) PCT No.: PCT/SE2019/050006
§ 371 (c)(1),
(2) Date: Jun. 28, 2021

(87) PCT Pub. No.: WO2020/141988
PCT Pub. Date: Jul. 9, 2020

(65) Prior Publication Data
US 2022/0078048 A1    Mar. 10, 2022

(51) Int. Cl.
*H04L 25/02* (2006.01)
*H04L 27/26* (2006.01)

(52) U.S. Cl.
CPC ...... *H04L 25/0216* (2013.01); *H04L 25/0228* (2013.01); *H04L 27/261* (2013.01)

(58) Field of Classification Search
None
See application file for complete search history.

(56) References Cited

U.S. PATENT DOCUMENTS

| 6,782,043 B1 * | 8/2004 | Dehghan | H04B 3/46 375/348 |
| 9,219,629 B1 * | 12/2015 | Sun | H04L 25/0206 |

(Continued)

FOREIGN PATENT DOCUMENTS

| CN | 104488305 A | 4/2015 |
| DE | 102006024910 A1 | 5/2007 |

(Continued)

OTHER PUBLICATIONS

EPO Communication with Supplementary European Search Report dated Jul. 8, 2022 for Patent Application No. 19907587.0, consisting of 9-pages.

(Continued)

*Primary Examiner* — Clemence S Han
(74) *Attorney, Agent, or Firm* — Christopher & Weisberg, P.A.

(57) ABSTRACT

A method and a receiving node for determining a channel window length ($l^\wedge$) for a transformed domain channel estimator, the channel window length ($l^\wedge$) to be applied for a particular reference signal (RS) carrying symbol. At least two subsets ($A_1, A_2, \ldots$) of received RS carrying symbols are obtained out of a set of RS carrying symbols ($\{S_1, S_2, \ldots\}$), where the particular RS carrying symbol is included in at least one of the at least two subsets ($A_1, A_2, \ldots$). A corresponding hypothesis channel window length ($l^*$) is determined for the at least one of the subsets ($A_1, A_2, \ldots$) based on a set of channel responses. The channel window length ($l^\wedge$) for the particular RS carrying symbol is then determined based on the corresponding hypothesis channel window length ($l^*$).

18 Claims, 7 Drawing Sheets

(56) References Cited

U.S. PATENT DOCUMENTS

| | | | | |
|---|---|---|---|---|
| 2006/0140297 | A1* | 6/2006 | Maltsey | H04L 25/0204 375/260 |
| 2006/0222099 | A1* | 10/2006 | Varadarajan | H04L 25/0216 375/340 |
| 2007/0064824 | A1* | 3/2007 | Wang | H04L 25/03006 375/260 |
| 2009/0028220 | A1* | 1/2009 | Roh | H04B 17/327 375/136 |
| 2009/0059885 | A1* | 3/2009 | Sadek | H04L 25/0232 370/343 |
| 2009/0164542 | A1* | 6/2009 | Wu | H04B 1/7097 708/319 |
| 2010/0215087 | A1* | 8/2010 | Tsai | H04L 27/261 375/220 |
| 2011/0038404 | A1* | 2/2011 | Hou | H04L 25/0216 375/350 |
| 2015/0009847 | A1* | 1/2015 | Iwai | H04L 25/024 370/252 |
| 2015/0156037 | A1* | 6/2015 | Sahlin | H04L 25/023 375/349 |
| 2019/0207730 | A1* | 7/2019 | Park | H04L 27/2614 |
| 2021/0075645 | A1* | 3/2021 | Stathakis | H04L 25/0216 |

FOREIGN PATENT DOCUMENTS

| | | |
|---|---|---|
| WO | 2012099511 A1 | 6/2012 |
| WO | 2019114973 A1 | 6/2019 |

OTHER PUBLICATIONS

Krondorf M. et al.; Algorithms and Applications of Channel Impulse Response Length Estimation for MIMO-OFDM; European Transactions on Telecommunications; Wiley and Sons; vol. 18, No. 6; Oct. 1, 2007, consisting of 12-pages.

International Search Report and Written Opinion dated Nov. 15, 2019 for International Application No. PCT/SE2019/050006 filed Jan. 4, 2019, consisting of 12-pages.

J. Choi; Multipath CDMA channel estimation by jointly utilising pilot and traffic channels; IEEE Proceedings: Communications; vol. 146, Issue 5, Oct. 14, 1999, consisting of 7-pages.

3GPP TSG RAN WG1 Meeting 91; RAN1 Chairman's Notes: Nov. 27-Dec. 1, 2017, Reno, USA, consisting of 180-pages.

3GPP TS 38.211 V15.0.0; 3rd Generation Partnership Project; Technical Specification Group Radio Access Network; NR; Physical channels and modulation (Release 15); Dec. 2017, consisting of 73-pages.

Meili Zhou et al.: DCT-Based Channel Estimation Techniques for LTE Uplink; 2009 IEEE 20th International Symposium on Personal, Indoor and Mobile Radio Communications, Sep. 2009, consisting of 5-pages.

Indian Office Action dated Mar. 10, 2022 for Patent Application No. 202117032090, consisting of 7-pages.

\* cited by examiner

▨ Extra RS

METHOD AND RECEIVING NODE FOR DETERMINING CHANNEL WINDOW LENGTH

CROSS-REFERENCE TO RELATED APPLICATIONS

This application is a Submission Under 35 U.S.C. § 371 for U.S. National Stage Patent Application of International Application Number: PCT/SE2019/050006, filed Jan. 4, 2019 entitled "METHOD AND RECEIVING NODE FOR DETERMINING CHANNEL WINDOW LENGTH," the entirety of which is incorporated herein by reference.

TECHNICAL FIELD

The present disclosure relates generally to a method and a receiving node, for determining a channel window length l^ for a transformed domain channel estimator.

BACKGROUND

In the field of wireless communication, channel estimation is often performed in a receiving node based on known reference signals received in symbols, herein referred to as RS symbols, e.g. at regular intervals. When operating in a wireless network, channel estimation in the receiving node generally enables improved detection of received radio signals which are more or less contaminated by various noise and interference from other transmissions. If efficient channel estimation is accomplished, higher data rates can be used in the communication and the capacity of the network can be improved, even when the radio conditions are poor and/or the relative speed between transmitter and receiver is high.

This disclosure may be applied to a wireless network where signals are communicated using Orthogonal Frequency-Division Multiplexing, OFDM. For example, the wireless network may be operating according to Long Term Evolution (LTE) or according to 5G, also referred to as "New Radio" (NR), both being defined by the third Generation Partnership Project, 3GPP. The term "receiving node" used herein may refer to a wireless device, sometimes denoted User Equipment (UE), or to a network node which may be denoted base station, eNB or gNB, depending on the terminology used. The present disclosure is not limited to any particular types of receiving node.

The physical layer of NR is expected to handle many different transmission scenarios by supporting multiple transmission numerologies, variable data transmission time intervals and early decoding for latency critical applications. These transmission scenarios impose a need for the physical layer to be even more flexible than LTE.

Similar to LTE, NR will adopt OFDM based waveforms with physical layer channels (control and data) and reference signals mapped on radio resources organized in a time-frequency resource grid. Different forms of reference signals exist in the NR physical layer for reliable estimation of channel features which serve diverse purposes, for instance, demodulation reference signals (DMRS), sounding reference signals (SRS), channel state information reference signals (CSI-RS), phase tracking reference signals (PTRS), and tracking reference signals (TRS).

However, it may sometimes be a drawback that the channel estimation performed by a receiving node in a wireless network is not accurate enough to provide good and desirable performance and/or capacity in the network.

SUMMARY

It is an object of embodiments described herein to address at least some of the problems and issues outlined above. It is possible to achieve this object and others by using a method and a receiving node as defined in the attached independent claims.

According to one aspect, a method is performed by a receiving node for determining a channel window length for a transformed domain channel estimator, the channel window length to be applied for a particular reference signal, RS, carrying symbol. In this method, the receiving node obtains at least two subsets of RS carrying symbols out of a set of RS carrying symbols received at the receiving node, the particular RS carrying symbol being comprised in at least one of the at least two subsets of RS carrying symbols.

The receiving node further determines, for the at least one of the at least two subsets of RS carrying symbols, a corresponding hypothesis channel window length based on a set of channel responses, each channel response in said set of channel responses corresponding to a respective RS carrying symbol of said at least one of the at least two subsets of RS carrying symbols.

The receiving node then determines the channel window length for the particular RS carrying symbol comprised in the at least one of the at least two subsets of RS carrying symbols based on the determined corresponding hypothesis channel window length.

According to another aspect, a receiving node is arranged to determine a channel window length for a transformed domain channel estimator, the channel window length to be applied for a particular reference signal, RS, carrying symbol. The receiving node is configured to obtain at least two subsets of RS carrying symbols out of a set of RS carrying symbols received at the receiving node, the particular RS carrying symbol being comprised in at least one of the at least two subsets of RS carrying symbols.

The receiving node is further configured to determine, for the at least one of the at least two subsets of RS carrying symbols, a corresponding hypothesis channel window length based on a set of channel responses, each channel response in said set of channel responses corresponding to a respective RS carrying symbol of said at least one of the at least two subsets of RS carrying symbols.

The receiving node is also configured to determine the channel window length for the particular RS carrying symbol comprised in the at least one of the at least two subsets of RS carrying symbols based on the determined corresponding hypothesis channel window length.

When using either of the above method and receiving node, it is an advantage that channel estimation can be made faster and more accurate and reliable than when using conventional techniques, and without adding too much complexity.

The above method and receiving node may be configured and implemented according to different optional embodiments to accomplish further features and benefits, to be described below.

A computer program is also provided comprising instructions which, when executed on at least one processor in the above receiving node, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of illustrative examples and with reference to the accompanying drawings, in which.

DETAILED DESCRIPTION

Briefly described, a solution is provided to improve the performance of channel estimation as compared to conventional channel estimation techniques. In this solution, it has been realized that the performance and accuracy of channel estimation is largely dependent of how well a channel window length used for taking samples in a Reference Signal (RS) symbol is covering the wanted channel taps and does not cover parts with noise only. Therefore, it is beneficial if the channel window length is not too large so that parts with noise only are sampled, nor too small so that any useful channel taps are missed and not sampled.

A high performance of channel estimation can be achieved by finding an accurate channel window length for an RS symbol so that useful samples of the signal can be taken within the channel window length of said RS symbol. The samples taken within that channel window length are then used as a basis for performing channel estimation. It will be described below how such an accurate channel window length can be determined according to some embodiments and examples.

Figure 1:
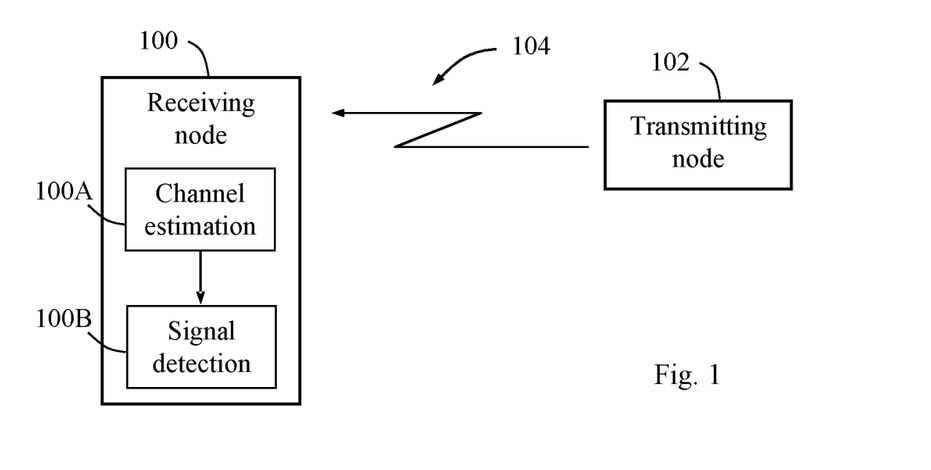
FIG. 1 is a communication scenario involving a receiving node and a transmitting node, where the solution may be used in the receiving node.

FIG. 1 illustrates schematically a communication scenario where the solution may be used when a receiving node 100 receives signals 104 transmitted from a transmitting node 102. This figure illustrates a basic operation of the receiving node 100 as follows. The receiving node 100 continuously performs channel estimation 100A on reference signals from the transmitting node 102 and uses the estimated channel as input for signal detection 100B on any other signals from the transmitting node 102 carrying control and data. This figure will be used as a reference when describing various examples and features below. The receiving node 100 may alternatively be denoted a communication node or a radio node, which alternative terms could be used throughout the description instead of receiving node or radio receiving node.

The solution will be described and explained herein in terms of functionality in a receiving node which is operable to perform channel estimation based on received reference signals, and also to determine a channel window length for a transformed domain channel estimator. The determined channel window length to be used for the channel estimation is generally denoted $l^\wedge$ herein.

The term "receiving node" used throughout this disclosure can be understood as a logical entity that may be realized in one or more physical nodes such as a wireless device or a network node that is capable of receiving and processing received radio signals and of performing channel estimation based on such received signals.

First, some techniques and features for performing channel estimation based on received reference signals will be discussed.

It was mentioned above that known reference signals may be received in RS symbols at regular and thus predictable intervals. In NR for example, multiple DMRS patterns are defined which can be signaled by control information to wireless devices. One reason of using multiple DMRS patterns in NR is to meet the need of various channel conditions and use cases, e.g., various mobility, SNR, payload, and decoding latency.

Some examples of how reference signals may be transmitted in different patterns of symbols containing the RS according to NR, are illustrated FIGS. 2A-D, where the RS symbols are comprised in a resource block having a time-frequency grid of 14 symbols 0-13 distributed in the time domain and 12 subcarriers distributed in the frequency domain. The RSs may be DMRSs as indicated in the figures, although other RSs could also be employed in the illustrated manner.

Four different RS patterns are illustrated in these examples as follows.

Figure 2A:
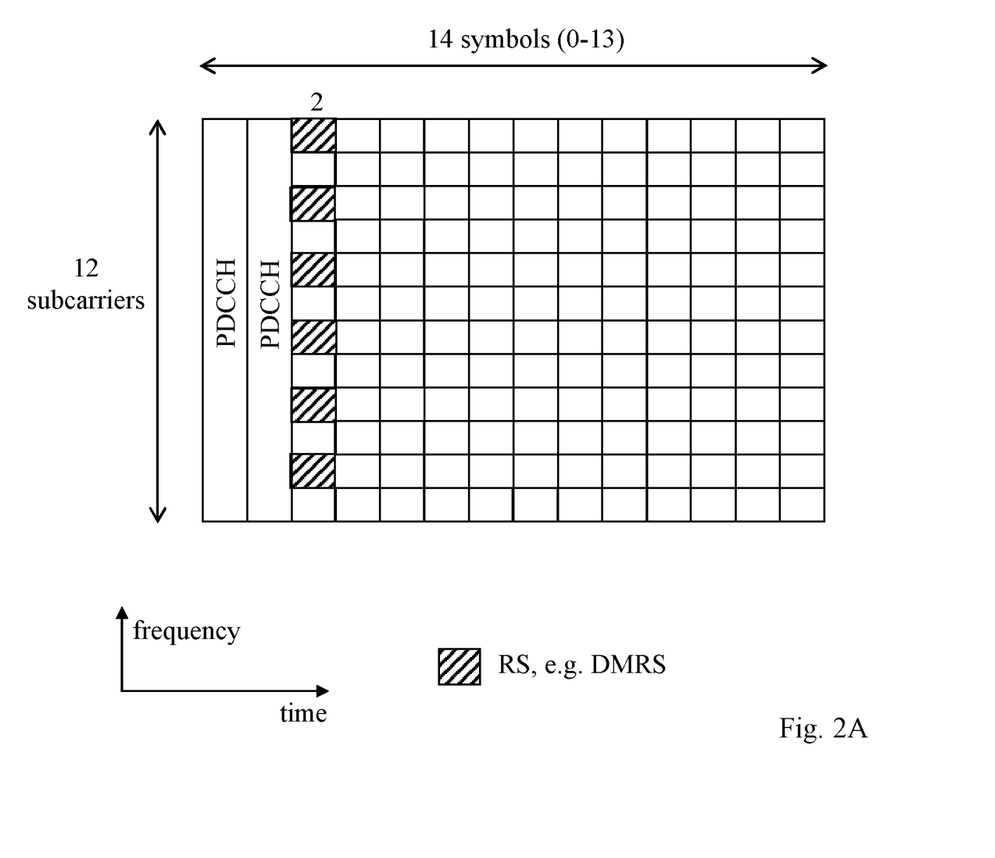
FIGS. 2A-D illustrate some examples of how reference signals may be transmitted in different patterns of RS symbols according to NR.

In FIG. 2A, RSs occur in every second subcarrier in symbol 2. This pattern is categorized as a single-symbol front loaded pattern.

Figure 2B:
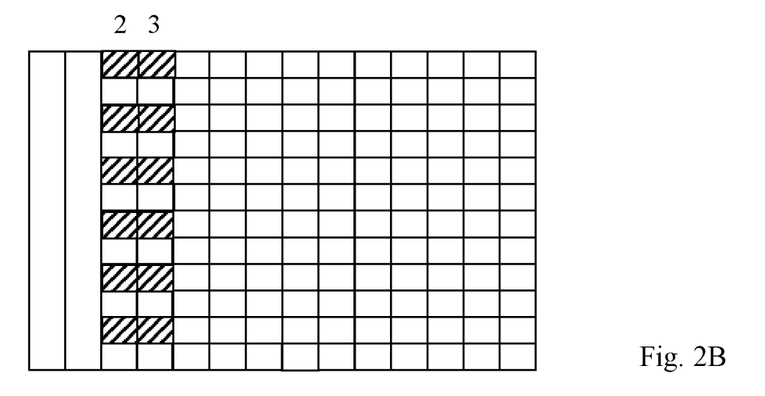

In FIG. 2B, RSs occur in every second subcarrier in symbols 2 and 3. This pattern is categorized as a double-symbol front loaded pattern.

Figure 2C:
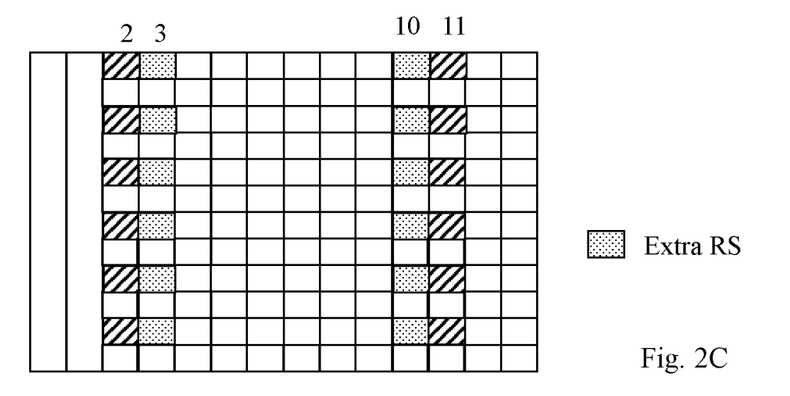

In FIG. 2C, RSs occur in every second subcarrier in symbols 2 and 11, and so-called "extra RSs" also occur in every second subcarrier in symbols 3 and 10. This pattern is categorized as a front loaded and back loaded pattern.

Figure 2D:
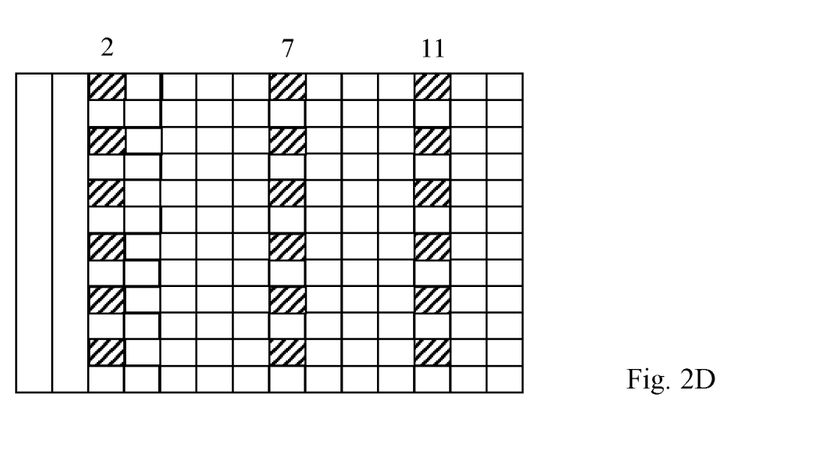

In FIG. 2D, RSs occur in every second subcarrier in symbols 2, 7 and 11. This pattern is categorized as a multiple (>2 symbols) distributed pattern.

NR supports both frequency-division-multiplexed (FDM) and code-division-multiplexed (CDM) RS ports on the same OFDM symbol for multi-layer/UE transmissions. Accurate and reliable estimation of channel features in various transmission scenarios is critical for NR performance, since the channel estimation performance impacts the sequential signal processing units.

In a transmission of the NR system, the DMRS patterns in the physical layer are expected to be dynamically or semi-statically configured. Therefore, an efficient channel estimator needs to be adaptive, in order to utilize all the information that is available in the different patterns, and at the same time with low complexity.

There are mainly two types of channel estimator solutions used in practice for OFDM system:
1. Wiener filter in the frequency domain, and
2. Filter in some transformed domain.

Usually, the wiener filter in the frequency domain needs a reliable channel analyzer which is typically operated on the transformed domain, in order to set up the filter shape and provide input parameters such as noise variance to the channel estimation. It can be assumed that the second solution will often be implemented in practice.

Channel estimation on the transformed domain comprises identifying a valid number of channel taps from the noisy samples. Considering N noisy samples in the transformed domain, the actual channel is only contained in L samples, where L is less than N, whereas the remaining N-L samples contain only noise and interference. In typical broadband transmissions, the N samples, also referred to as the N-length sample vector, are sparse in the transform domain, i.e., L<<N, meaning that the number of taps is much smaller than the number of available samples.

The channel estimator computes a window length $\hat{L}$, such that the first $\hat{L}$ taps/samples are kept, and outside this window the samples are assumed to be noise and/or interference and will therefore not be used. Selecting a fitting window length that is neither too short nor too long, is a significant operation of the channel estimator. The criterion to be used for window length selection, can basically be casted in two categories:
1. Linear selection methods that choose $\hat{L}$ to be proportional to the length of the input noisy samples, i.e., a fraction x % of the samples is maintained where the value of x can be freely chosen.
2. Adaptive methods which compute $\hat{L}$ using some function to identify channel taps from the pure noise samples based on obtained/estimated statistics.

In order to obtain accurate and reliable channel estimation for various use-cases, the aforementioned window selection methods encounter some limitations. First, the linear selection cannot cope with time-varying transmission scenarios, since the choice of x is usually tailored for a range of specific types of transmission. For example, proportional selection may be too conservative for a highly dispersive channel, i.e., too few samples may be kept relative to the actual number of channel taps when x is small. The opposite can also be true so that the proportional selection may be too aggressive keeping too much noise by retaining a high fraction of the input N-length vector.

Second, for the narrow-band transmission or for the transmission which uses a large number of orthogonal RS ports, the channel taps may be largely dispersive inside the transformed domain which impairs the orthogonality across DMRS ports. In this scenario, commonly referred to as a pilot contamination scenario, the adaptive methods encounter difficulties determining the useful statistics, therefore render unstable window length estimation. Moreover, in the low SNR region, where the desired channel taps are dominated by noise, adaptive methods cannot easily identify where the channel taps are located.

For time varying channels, channel estimation on the physical channel is typically carried out by interpolation of the estimates from multiple distributed DMRS symbols. If the channel estimation on each of the DMRS symbols are not reliable, the interpolation performance in the time domain is foreseen to be unstable. For tough channel conditions, e.g., high mobility, low SNR, small allocation, it is usually a challenge to provide reliable channel estimation due to the reasons above.

Figure 3:
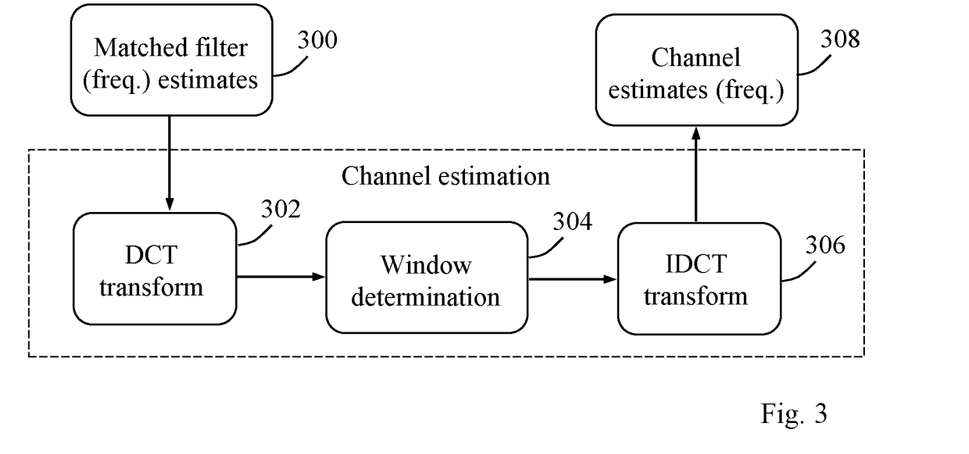
FIG. 3 is a schematic block diagram illustrating a procedure for channel estimation in a receiving node, where the solution may be utilized.

In FIG. 3, it is illustrated how a channel estimator operates based on the above-mentioned transformed domain filter solution. First, matched filter estimates of received samples are obtained in the frequency domain, in an operation 300. The obtained estimates are subjected to a Discrete Cosine Transform, DCT, in a next operation 302. The window length is determined in a further operation 304. The samples falling within the window are then subjected to an Inverse Discrete Cosine Transform, IDCT, in a next operation 306. Finally, the transformed and filtered samples are provided as channel estimates in the frequency domain, in an operation 308.

In this disclosure, an adaptive window selection procedure for the transformed domain channel estimator will be described. This procedure can be useful in a scenario where multiple RS symbols are available that can be used in the time domain. The following two operations may be employed:
1. Given the available RS in multiple symbols, determine two or more subsets of RSs that can be used jointly for window estimation. Each element in a determined subset corresponds to a RS symbol. The channels in the RS symbols within each subset can be considered to be correlated, and the channels in the RS symbols across two subsets can be considered independent of each other.
2. Perform joint window length estimation based on the determined subsets, which may include the following sub-operations:
   a. Based on all the available RS symbols (regardless of which subset they belong to), estimate noise statistics, e.g. mean and variance.
   b. In each subset, apply the joint estimation on the window length based on the estimated noise statistics.
   c. Make a final decision of the window length estimation on each of the RS symbols, based on the estimation from all subsets.

Figure 4:
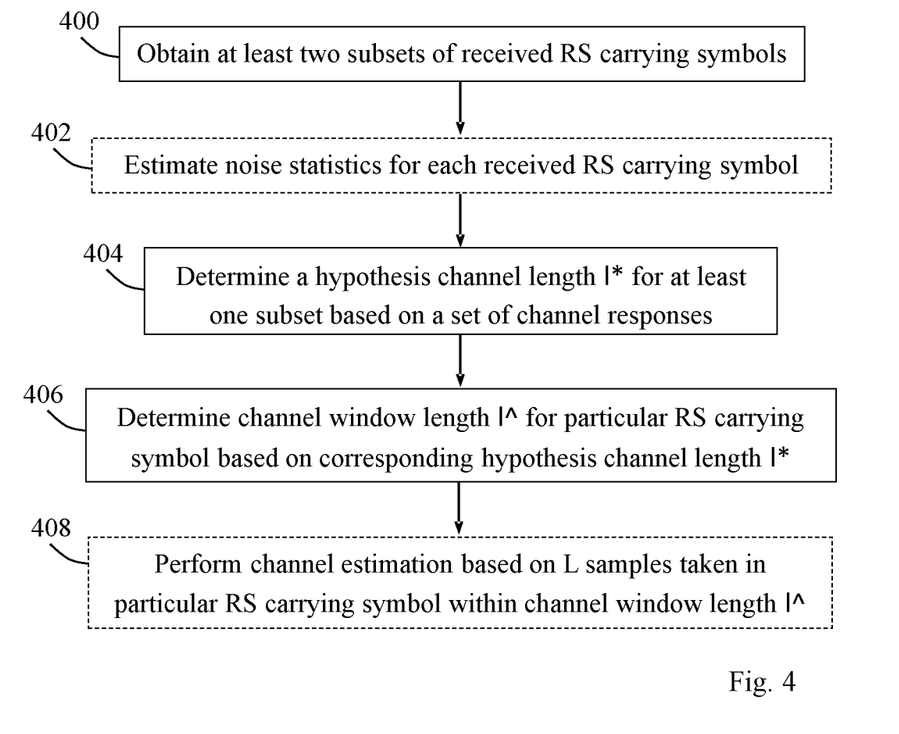
FIG. 4 is a flow chart illustrating a procedure in a receiving node, according to some examples.

An example of how the solution may be employed in terms of actions performed by a receiving node, such as the receiving node 100 in FIG. 1, is illustrated by the flow chart in FIG. 4 which will now be described with further reference to FIG. 1, although this procedure is not limited to the example of FIG. 1. FIG. 4 thus illustrates a method or procedure in the receiving node 100 for determining a channel window length $\hat{L}$ for a transformed domain channel estimator, the channel window length $\hat{L}$ to be applied for a particular reference signal (RS) carrying symbol. Some optional example embodiments that could be used in this procedure will also be described. Throughout this disclosure, the term RS carrying symbols could be replaced by "RS symbols" for short.

A first action 400 illustrates that the receiving node 100 obtains at least two subsets $A_1, A_2, \ldots$ of RS carrying symbols out of a set of RS carrying symbols $\{S_1, S_2, \ldots\}$ received at the receiving node 100, the particular RS carrying symbol being comprised in at least one of the at least two subsets $A_1, A_2, \ldots$ of RS carrying symbols.

In another action 402, the receiving node 100 may estimate noise statistics related to at least one of noise mean and noise variance for the RS carrying symbols in the received set of RS carrying symbols $\{S_1, S_2, \ldots\}$. The estimated noise statistics can then be used for calculating the likelihood of a number of hypothesis channel window lengths. For example, it may be used for calculating the likelihood of each hypothesis channel window length l in the set of hypothesis channel window lengths.

In another action 404, the receiving node 100 determines, for the at least one of the at least two subsets $A_1, A_2, \ldots$ of RS carrying symbols, a corresponding hypothesis channel window length l* based on a set of channel responses. Throughout this disclosure, the term channel response could be replaced by the more descriptive term "channel impulse response". Each channel response or channel impulse response in said set of channel responses corresponds to a respective RS carrying symbol of said at least one of the at least two subsets $A_1, A_2, \ldots$ of RS carrying symbols.

In a further action 406, the receiving node 100 determines the channel window length l^ for the particular RS carrying symbol, or particular RS symbol for short, comprised in the at least one of the at least two subsets $A_1, A_2, \ldots$ of RS carrying symbols, based on the corresponding hypothesis channel window length l* determined in action 404.

Some further examples of embodiments that may be employed in the above procedure in FIG. 3 will now be described. In one example embodiment, the receiving node 100 may further perform channel estimation for the particular RS carrying symbol based on L samples in the frequency domain taken in the particular RS carrying symbol within the determined channel window length l^, as illustrated by another action 408.

In another example embodiment, determining the corresponding hypothesis channel window length l* for the at least one of the at least two subsets $A_1, A_2, \ldots$ of RS carrying symbols in action 404 may be performed by executing the following two operations:

1) calculating a likelihood of each hypothesis channel window length l in a set of hypothesis channel window lengths based on samples, taken in the RS carrying symbols comprised in the at least one of the at least two subsets $A_1, A_2, \ldots$ of RS carrying symbols, within the respective hypothesis channel window length l, and 2) selecting, as the corresponding hypothesis channel window length (l*) for the at least one of the at least two subsets $A_1, A_2, \ldots$ of RS carrying symbols, the hypothesis channel window length with highest likelihood, out of the set of hypothesis channel window lengths.

In another example embodiment, the likelihood of each hypothesis channel window length l in the set of hypothesis channel window lengths may be calculated as $P(l)=f(y(S_1), y(S_2), \ldots, l)$, where $y(S_1), y(S_2) \ldots$ denote sample sequences taken in respective RS carrying symbols $S_1, S_2, \ldots$ for the hypothesis channel window length (l) and $f(y(S_1), y(S_2), \ldots, l)$ denotes a likelihood function based on the RS carrying symbols, out of the set of RS carrying symbols $\{S_1, S_2, \ldots\}$, comprised in the at least one of the at least two subsets $A_1, A_2, \ldots$ of RS carrying symbols.

In another example embodiment, when the foregoing embodiment is employed, the likelihood function $f(y(S_1), y(S_2), \ldots, l)$ may in one alternative be calculated by first calculating an average sample sequence as $y(S_1, S_2 \ldots S_n)=1/n\ [y(S_1)+y(S_2)+\ldots+y(S_n)]$, and then calculating the likelihood $f(y(S_1), y(S_2) \ldots y(S_n), l)$ of the hypothesis channel window length (l) based on the average sample sequence $y(S_1, S_2 \ldots S_n)$.

In another example embodiment, the likelihood function $f(y(S_1), y(S_2) \ldots, l)$ may in another alternative be calculated by first calculating a log-likelihood of the hypothesis channel window length (l) for each RS symbol separately as $f(y(S_1), l), f(y(S_2), l) \ldots f(y(S_n), l)$, respectively, and then calculating a joint likelihood of the hypothesis channel window length (l) as $f(y(S_1), y(S_2) \ldots y(S_n), l)=f(y(S_1), l)+f(y(S_2), l)+\ldots f(y(S_n), l)$.

In another example embodiment, the particular RS carrying symbol may be comprised in more than one of the obtained at least two subsets $A_1, A_2, \ldots$ of RS carrying symbols, and in that case the channel window length l^ for said particular RS carrying symbol may be determined as an average of respective corresponding hypothesis channel window lengths l* determined for each of the more than one of the obtained at least two subsets $A_1, A_2, \ldots$ of RS carrying symbols.

In another example embodiment, noise statistics related to at least one of noise mean and noise variance may be estimated, as shown in action 402, for the RS carrying symbols in the received set of RS carrying symbols $\{S_1, S_2, \ldots\}$, and the estimated noise statistics could in that case be used for calculating the likelihood of each hypothesis channel window length l in the set of hypothesis channel window lengths.

In further example embodiments, when the foregoing embodiment is employed, the noise statistics may be estimated using averaging over samples within a hypothesis noise window for RS carrying symbols in two or more of said obtained at least two subsets (A1, A2, . . . ) of RS carrying symbols, or by estimating the noise mean and/or noise variance in each of the at least two subsets (A1, A2, . . . ) of RS carrying symbols over samples within the hypothesis noise window on each received RS carrying symbol in the respective one of the at least two subsets (A1, A2, . . . ) of RS carrying symbols.

In another example embodiment, the separation of RS carrying symbols in each one of the obtained at least two subsets A1, A2, . . . of RS carrying symbols does not exceed a certain specified number of symbols d. The number of symbols d is limited by the largest distance between two RS carrying symbols in the received set of RS carrying symbols $\{S_1, S_2, \ldots\}$. In NR, this number is limited to d<=12 (e.g, the first symbol number 0, and the last symbol number 13, i.e. the number of symbols is 14). The subsets $A_1, A_2, \ldots$ of RS carrying symbols may be formed so that the number of symbols d in one or more, or in each one, of the subsets $A_1, A_2, \ldots$ of RS carrying symbols is less than the largest distance between two RS carrying symbols in the received set of RS carrying symbols $\{S_1, S_2, \ldots\}$.

In further example embodiments, when the foregoing embodiment is employed, the specified number of symbols d is based on at least one of: slot format of the RS, carrier frequency of the RS, a subcarrier spacing used for transmission of the RS, relative speed between the receiving node 100 and a transmitting node 102, and a precoder applied to the RS.

In another example embodiment, said determination of the channel window length l^ may be performed in a transformed domain achieved by Fast Fourier Transform (FFT) or Discrete Cosine Transform (DCT), or any other invertible transform.

In another example embodiment, the RS carrying symbols may be Orthogonal Frequency-Division Multiplexing, OFDM, symbols.

The above method or procedure could also be described as follows, with further reference to FIG. 1.

The method is performed by a receiving node 100 for determining a channel window length l^ for a transformed domain channel estimator, the channel window length $\hat{l}$ to be applied for a particular reference signal (RS) carrying symbol. In this method, the receiving node 100 performs the following actions A-D:

A) Obtaining at least two subsets A1, A2, . . . of RS carrying symbols out of a set of RS carrying symbols {$S_1$, $S_2$, . . . } received at the receiving node 100, the first RS carrying symbol being comprised in at least one of the at least two subsets A1, A2, . . . of RS carrying symbols. The at least two subsets A1, A2, . . . of RS carrying symbols may comprise a first subset $A_1$ and a second subset $A_2$ of RS carrying symbols out of the set of RS carrying symbols {$S_1$, $S_2$, . . . }. The particular RS carrying symbol may be comprised in at least one of the first and second subsets $A_1$, $A_2$ of RS carrying symbols. In some examples, the particular RS carrying symbol may be comprised in each one of the first and second subsets $A_1$, $A_2$ of RS carrying symbols.

B) Determining, for the at least one of the at least two subsets $A_1$, $A_2$, . . . of RS carrying symbols, a corresponding hypothesis channel window length l* based on a set of channel responses, each channel response in said set of channel responses corresponding to a respective RS carrying symbol of said at least one of the at least two subsets $A_1$, $A_2$, . . . of RS carrying symbols. The corresponding hypothesis channel window length l* is a hypothesis channel window length that corresponds to the at least one of the at least two subsets $A_1$, $A_2$, . . . of RS carrying symbols in that it is determined based on a set of channel responses where each channel response in the set of channel responses corresponds to a respective RS carrying symbol of the at least one of the at least two subsets $A_1$, $A_2$, . . . of RS carrying symbols. Each channel response in the set of channel responses may be determined from N respective samples in the frequency domain taken in a respective RS carrying symbol of the at least one of the at least two subsets $A_1$, $A_2$, . . . of RS carrying symbols.

C) Determining the corresponding hypothesis channel window length l* for the at least one of the at least two subsets $A_1$, $A_2$, . . . of RS carrying symbols may comprise determining at least one of a corresponding first hypothesis channel window length $l_1$* for the first subset $A_1$ of RS carrying symbols and a corresponding second hypothesis channel window length $l_2$* for the second subset $A_2$ of RS carrying symbols. In some examples, e. g. when the particular RS carrying symbol is comprised in each one of the first and second subsets $A_1$, $A_2$ of RS carrying symbols, determining at least one of a corresponding first hypothesis channel window length $l_1$* for the first subset $A_1$ of RS carrying symbols and a corresponding second hypothesis channel window length $l_2$* for the second subset $A_2$ of RS carrying symbols may comprise determining, for the first and second subsets $A_1$, $A_2$ of RS carrying symbols, the corresponding first and second hypothesis channel window lengths $l_1$*, $l_2$*. The corresponding first and second hypothesis channel window lengths $l_1$*, $l_2$* may be determined based on first and second sets of channel responses respectively. The corresponding first and second hypothesis channel window lengths $l_1$*, $l_2$* are hypothesis channel window lengths that correspond to the first and second subsets $A_1$, $A_2$ of RS carrying symbols respectively in that the corresponding first hypothesis channel window length $l_1$* is determined based on the first set of channel responses, where each channel response in the first set of channel responses corresponds to a respective RS carrying symbol of the first subset $A_1$ of RS carrying symbols, and the corresponding second hypothesis channel window length $l_2$* is determined based on the second set of channel responses, where each channel response in the second set of channel responses corresponds to a respective RS carrying symbol of the second subset $A_2$ of RS carrying symbols. Each channel response in the first and second sets of channel responses may be determined from N respective samples in the frequency domain taken in a respective RS carrying symbol of said first and second subsets $A_1$, $A_2$ of RS carrying symbols respectively.

D) Determining the channel window length $\hat{l}$ for the particular RS carrying symbol comprised in the at least one of the at least two subsets $A_1$, $A_2$, . . . of RS carrying symbols based on the determined corresponding hypothesis channel window length l*. The at least one of the at least two subsets $A_1$, $A_2$, . . . of RS carrying symbols may be at least one of the first and second subsets $A_1$, $A_2$ of RS carrying symbols and the determined corresponding hypothesis channel window length l* may be at least one of the corresponding first and second hypothesis channel window lengths $l_1$*, $l_2$* for the at least of the first and second subsets $A_1$, $A_2$ of RS carrying symbols respectively. In some examples, e. g. when the particular RS carrying symbol is comprised in each one of the first and second subsets $A_1$, $A_2$ of RS carrying symbols, the at least one of the at least two subsets $A_1$, $A_2$, . . . of RS carrying symbols may comprise the first and second subsets $A_1$, $A_2$ of RS carrying symbols and the determined corresponding hypothesis channel window length l* may comprise the corresponding first and second hypothesis channel window lengths $l_1$*, $l_2$* for the first and second subsets $A_1$, $A_2$ of RS carrying symbols respectively. In this case the channel window length $\hat{l}$ for the particular RS carrying symbol comprised in each of the first and the second subsets $A_1$, $A_2$ of RS carrying symbols is thus determined based on the determined corresponding first and second hypothesis channel window lengths $l_1$*, $l_2$* for the first and second subsets $A_1$, $A_2$ of RS carrying symbols.

Figure 5:
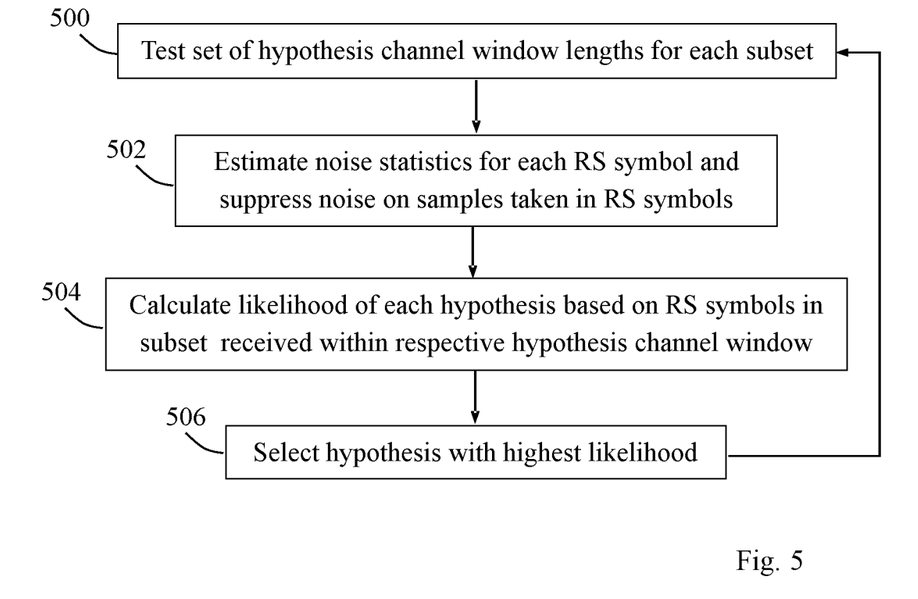
FIG. 5 is another flow chart illustrating how the receiving node may perform parts of the procedure in FIG. 4, according to further examples.

FIG. 5 illustrates another example of a procedure that could be performed by the receiving node 100 for determining a suitable channel window length to be applied in channel estimation. In this example, a number of hypothesis channel window lengths are tested to identify which hypothesis is likely to be the best basis for channel estimation. It is assumed that the receiving node 100 has obtained at least two subsets $A_1$, $A_2$, . . . of RS carrying symbols in the manner described for action 400 above.

In a first action 500, the receiving node 100 obtains or selects a set of hypothesis channel window lengths to be tested for each subset of RS carrying symbols. In a next action 502, the receiving node 100 estimates noise statistics for each RS symbol in the sets and uses the noise statistics to suppress the noise on samples taken in the obtained RS symbols.

In a next action 504, the receiving node 100 calculates a likelihood of each hypothesis channel window length based on the RS symbols in each subset received within the respective channel window. Thereby, the receiving node 100 is able to select, in an action 506, the hypothesis channel window length that has the highest likelihood as calculated in action 504, for use in the channel estimation. The actions 500-506 can be repeated for multiple successive subsets of obtained RS carrying symbols.

Figure 6:
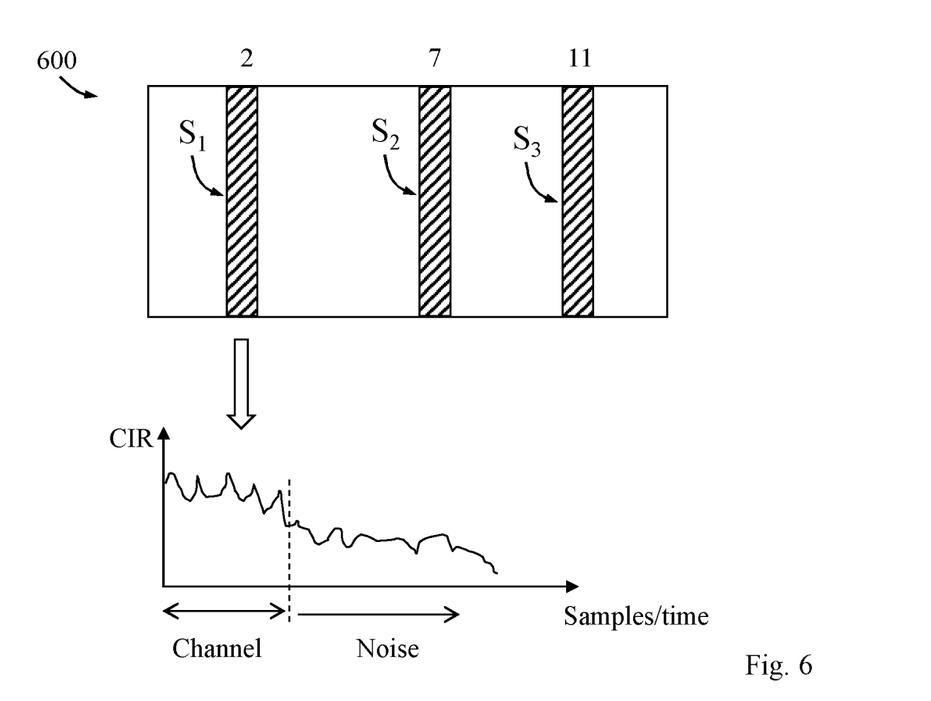
FIG. 6 illustrates how the noisy Channel Impulse Response (CIR) of samples taken in either of three symbols may fluctuate over time, which may be utilized in the procedures herein.

In FIG. 6, an example of how two subsets $A_1$, $A_2$ of RS carrying symbols could be employed in the embodiments herein, is illustrated. In this figure, a resource block of the above-mentioned multiple distributed pattern is shown where the RS carrying symbols denoted $S_1$, $S_2$ and $S_3$ occur in symbols 2, 7 and 11, respectively, as also shown in FIG. 2D. The first subset $A_1$ of RS carrying symbols includes the RSs $S_1$ and $S_2$ while the second subset $A_2$ of RS carrying symbols includes the RSs $S_2$ and $S_3$. Hence, the RSs $S_2$ are included in both subsets $A_1$, $A_2$. The diagram shown below the resource block illustrates how a channel impulse response (CIR) varies over a succession of samples taken during an RS carrying symbol. It can be seen that a first part of the symbol has a good channel response while a second part of the symbol is mainly dominated by noise. The optimal channel window length to be used for channel estimation would in this case be in the first part of the symbol with good channel impulse response.

An example of how at least some of the embodiments herein could be employed in practice, will now be described.

In this example, the solution is applied to a transmission using a single port DMRS. Further, joint estimation in the time domain is also employed and a multiple symbol DMRS pattern is also employed. A generalization for multi-port channel estimation can be made by changing the dimension of inputs. Below, a hypothesis channel window is referred to as a hypothesis for short.

Figure 7:
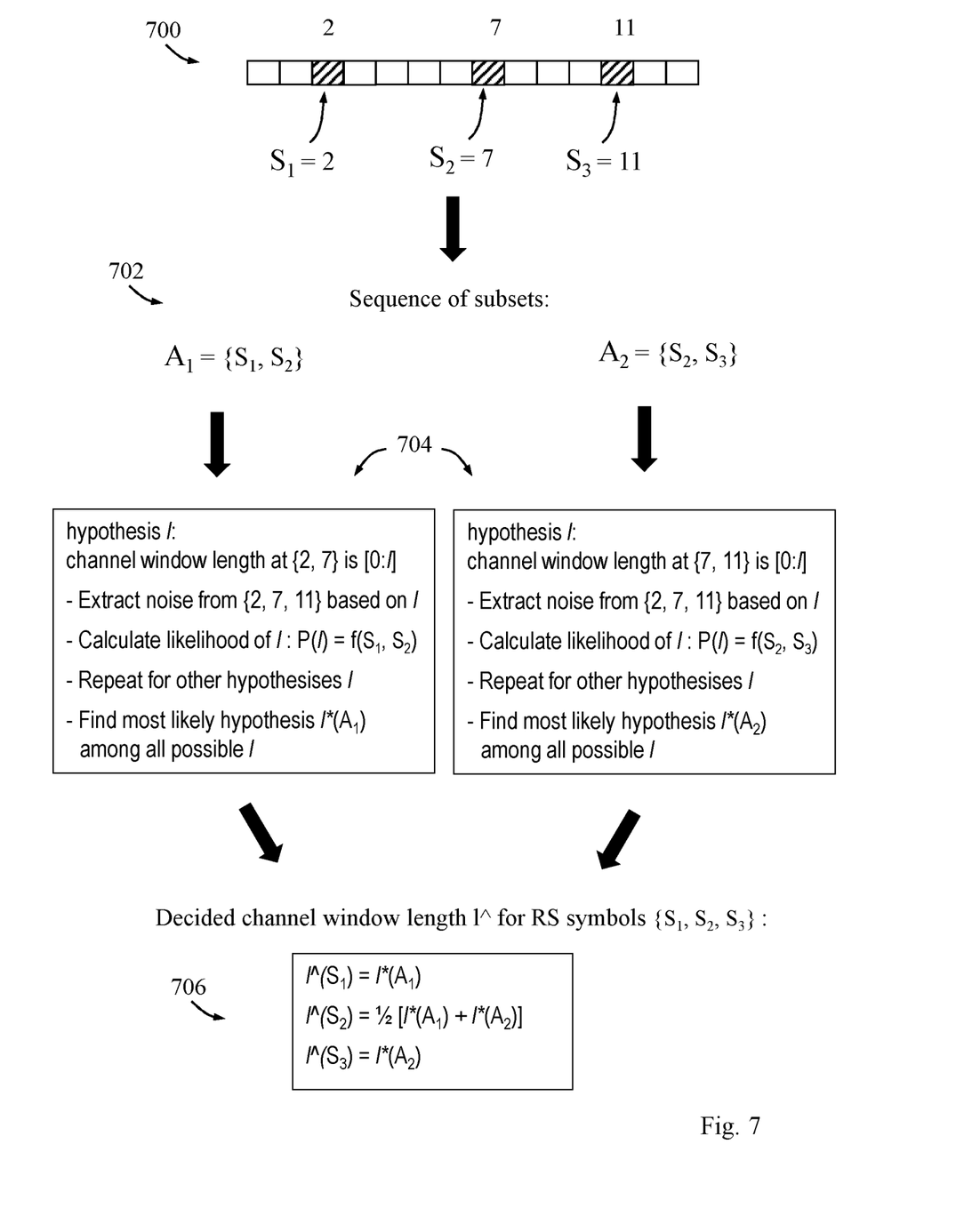
FIG. 7 is a logic diagram illustrating a procedure in a receiving node for finding an accurate channel window length for three RS symbols, where the solution may be utilized.

Considering a regular slot transmission, the DMRS symbols are indexed by symbol indices, e.g., $\{S_1, S_2, S_3\}$ where $S_i \in \lceil 0:13 \rceil$ An algorithm with operations 1-6, also illustrated in FIG. 7, can be employed as follows:

1. Determine a sequence of subsets based on the available DMRS symbols, such that the symbol indices in the same subset have mutual distance smaller than d. d is a parameter which varies depending on the scenario. Based on the agreed patterns for DMRS, a reasonable value to initialize d, in a regular transmission slot, would be d–7. The determined subsets of RS carrying symbols are for example:

$A_1 = \{S_1, S_2\}$, $A_2 = \{S_2, S_3\}$ such that the condition $|S_i - S_j| < d$ holds when the symbols belong to the same subset. $A_1$ and $A_2$ thus forms a sequence of subsets of RS carrying symbols which is illustrated at 700, 702 in FIG. 7, which also corresponds to the example in FIG. 6.

2. Hypothesis: Assume that in the transformed domain, which is obtained based on a single DMRS symbol, channel taps exist in the index window $\lceil 0:l \rceil$, and only noise samples exist in the window $\lceil l+1, N \rceil$, where N is the transform size. The window [0: l] is assumed to be the same for all RS symbols.

3. Perform noise level estimation based on the current hypothesis. Depending on the transmission scenarios, the noise estimation may be carried out in either intra- or inter-subset fashion. In the later part of this section, the detailed implementations of this operation are described.

4. Hypotheses testing in each subset, given the estimated noise statistics from operation 3 above. Taking $A_1 = \{S_1, S_2\}$ as an example, for the hypotheses [0: l], calculate the likelihood of the current hypothesis based on both of the RS symbols:

$$P(l) \stackrel{def}{=} f(S_1, S_2)$$

$f(S_1, S_2)$ denotes a likelihood function based on $\{S_1, S_2\}$. Depending on implementations, the likelihood function may have various forms.

The estimate of the window length corresponds to the hypothesis channel window with maximum likelihood. This can be expressed mathematically as follows:

$$l^* = \operatorname{argmax}_{l \in [0:N]} P(l).$$

It should be noted that $l^*$ corresponds to the same channel length for both DMRS symbols $S_1$ and $S_2$.

5. Repeat operation 4 for all subsets to obtain the window length on each DMRS symbol. Operations 2-5 are basically represented at 704 in FIG. 7.

6. If multiple estimates on the same symbol are carried out in the operations 4 and 5, the final decision on this symbol depends on those multiple estimates. For instance, for the window length on DMRS symbol $S_2$, two estimates are produced based on $A_1$ and $A_2$, denoted as $l^*(A_1)$ and $l^*(A_2)$, respectively. The final estimate $I^*$ can be determines as an average: $l^* = \frac{1}{2}(l^*(A_1) + l^*(A_2))$. This operation is basically represented at 706 in FIG. 7.

It can be noted that the embodiments and examples herein are fundamentally different compared with algorithms that average multiple single-shot window selection, because the effective Signal-to-Noise Ratio (SNR) improvement by noise suppression is carried out even before the hypothesis testing.

In operation 3 above, the noise statistics estimation may be carried out in two major alternative implementations:

1. Inter-subset noise estimation: The noise mean and noise variance estimation are averaged over the hypothesis noise window [l+1, N] from in two or more subsets (A1, A2, . . . ) of RS carrying symbols or from all RS symbols $\{S_1, S_2, S_3\}$.

2. Intra-subset noise estimation: For each subset, the noise mean and variance are estimated based on the hypothesis noise window [l+1, N] from the RS symbol(s) in the current subset.

The choice of inter- and intra-subset noise estimation is a receiver decision based on, for example:

If currently the transmission is in Multi-User (MU)-Multiple Input Multiple Output (MIMO) or Single-User (SU)-MIMO mode, which is informed dynamically by the control information via antenna port mapping in NR.

If strong interference on the RS positions is detected, or the interfering ports are signaled via antenna port or other control information.

If the interfering RS have the same footprint in the resource grid as the desired RS. This is detected by the receiver enabled with the functionality.

The decision in operation 3 above is made by the receiver in order to collect the RS symbols with similar noise feature together for estimation.

In operation 4 above, the calculation of $f(S_1, S_2)$ may contain two alternative implementations 1 and 2 below:

1. Average the noisy samples over two RS symbols and calculate the likelihood afterwards. For instance, let $y(S_1)$, $y(S_2)$ be two noisy sample sequences in the transformed domain, based on RS symbols $S_1$, $S_2$, respectively. Apply the sum and average:

$$y(S_1, S_2) \stackrel{def}{=} \frac{1}{2}[y(S_1) + y(S_2)]$$

Calculate the likelihood $f(S_1, S_2)$, based on the new samples $y(S_1, S_2)$.

2. Calculate the likelihood of the hypothesis on each of the sequences and combine them coherently afterwards. For instance, let $f(S_1)$ and $f(S_2)$ represent the log-likelihood of the hypothesis based on DMRS symbol $S_1$ and $S_2$, respectively. The joint likelihood is $f(S_1, S_2)=f(S_1)+f(S_2)$.

In a possible implementation, the input parameter d used for determining the subset of RS symbols can be chosen based on slot-format and carrier frequency.

In another possible implementation, the value of d can be chosen based on a correlation threshold $\rho_r$. For example, d may be selected to group RS sequences $S_k$ and $S_j$ such that correlation $(S_k S_j) > \rho_r$. The eNB/gNB can then compute the correlation of the group's sequences, based on the channel estimates, in order to perform new grouping.

In another possible implementation, d can be dynamically adapted as a function of the UE speed (or equivalently Doppler spread). For instance, if the UE and the propagation environment is (almost) static then the value of d can be increased.

In another possible implementation, d may depend on a precoder applied in the RS such that the RS using the same precoder can be jointly exploited.

In another possible implementation, the actual likelihood calculation of the window length hypothesis may be based on a certain model selection criterion, which regularizes the likelihood with a penalty on model order. These criterions include Bayesian (probabilistic) approaches such as Akaike information criterion (AIC), and heuristic approaches such as analyzing the shape of the noisy sequence.

In some further implementations, pre-processing on the input sequence may be carried out to extract the principal component in a desired order. For instance, sorting the sequence may be applied before input to the algorithm in order to focus on the samples with larger magnitude.

Figure 8:
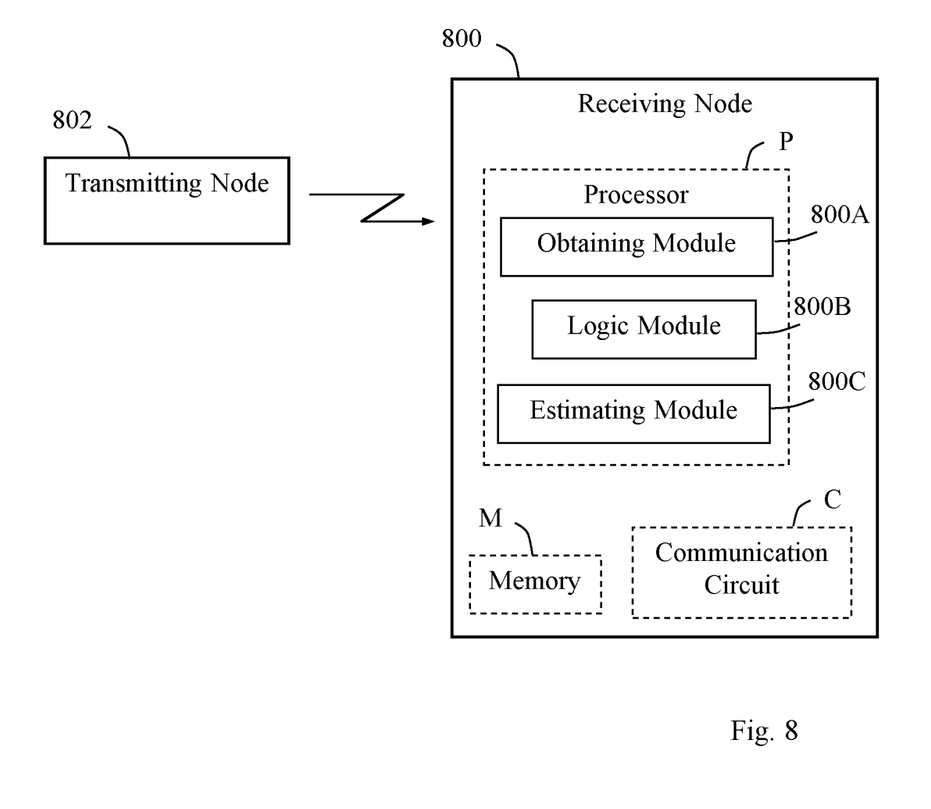
FIG. 8 is a block diagram illustrating how a receiving node may be structured, according to further examples.

The block diagram in FIG. 8 illustrates a detailed but non-limiting example of how a receiving node 800 may be structured to bring about the above-described solution and embodiments thereof. In this figure, the receiving node 800 may be configured to operate according to any of the examples and embodiments of employing the solution as described herein, where appropriate. The receiving node 800 is shown to comprise a processor "P", a memory "M" and a communication circuit "C" with suitable equipment for transmitting and receiving information and messages in the manner described herein.

The communication circuit C in the receiving node 800 thus comprises equipment configured for communication using a suitable protocol for the communication depending on the implementation. The solution is however not limited to any specific types of messages or protocols.

The receiving node 800 is, e.g. by means of units, modules or the like, configured or arranged to perform at least some of the actions of the flow chart in FIG. 4 as follows.

The receiving node 800 is arranged to determine a channel window length $l\hat{}$ for a transformed domain channel estimator, the channel window length $l\hat{}$ to be applied for a particular reference signal RS carrying symbol.

The receiving node 800 is configured to obtain at least two subsets $A_1, A_2, \ldots$ of RS carrying symbols out of a set of RS carrying symbols $\{S_1, S_2, \ldots\}$ received at the receiving node 800, the particular RS carrying symbol being comprised in at least one of the at least two subsets $A_1, A_2, \ldots$ of RS carrying symbols. This operation may be performed by an obtaining module 800A in the receiving node 800, as also illustrated in action 400. The obtaining module 800A could alternatively be named a receiving module or selecting module.

The receiving node 800 is also configured to determine, for the at least one of the at least two subsets $A_1, A_2, \ldots$ of RS carrying symbols, a corresponding hypothesis channel window length l* based on a set of channel responses, each channel response in said set of channel responses corresponding to a respective RS carrying symbol of said at least one of the at least two subsets $A_1, A_2, \ldots$ of RS carrying symbols. This operation may be performed by a logic module 800B in the receiving node 800, as also illustrated in action 404. The logic module 800B could alternatively be named a determining module or computing module.

The receiving node 800 is also configured to determine the channel window length $l\hat{}$ for the particular RS carrying symbol comprised in the at least one of the at least two subsets $A_1, A_2, \ldots$ of RS carrying symbols based on the determined corresponding hypothesis channel window length l*. This operation may be performed by the logic module 800B, as also illustrated in action 406.

The receiving node 800 may further be configured to perform channel estimation for the particular RS carrying symbol based on L samples in the frequency domain taken in the particular RS carrying symbol within the determined channel window length $l\hat{}$. This operation may be performed by an estimating module 800C in the receiving node 800, as also illustrated in action 408. The estimating module 800C could alternatively be named a channel estimator or similar.

It should be noted that FIG. 8 illustrates various functional modules in the receiving node 800 and the skilled person is able to implement these functional modules in practice using suitable software and hardware equipment. Thus, the solution is generally not limited to the shown structure of the receiving node 800, and the functional modules therein may be configured to operate according to any of the features, examples and embodiments described in this disclosure, where appropriate.

The functional modules 800A-C described above may be implemented in the receiving node 800 by means of program modules of a computer program comprising code means which, when run by the processor P causes the receiving node 800 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program may be carried by a computer program product in the receiving node 800 in the form of a memory having a computer readable medium and being connected to the processor P. The computer program product or memory M in the receiving node 800 thus comprises a computer readable medium on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the receiving node 800.

The solution described herein may be implemented in the receiving node 800 by a computer program comprising instructions which, when executed on at least one processor, cause the at least one processor to carry out the actions according to any of the above embodiments and examples, where appropriate. The solution may also be implemented at the receiving node 800 in a carrier containing the above computer program, wherein the carrier is one of an electronic signal, optical signal, radio signal, or computer readable storage medium.

Some further details and features that may be employed will now be described.

The procedure described herein can be used to estimate the delay spread of the channel used for setting up other types of channel estimators. In some implementations, the wiener filter for frequency domain channel estimator can be set up by the delay spread, and noise variance estimated from the proposed method.

In the case of a low-latency application and/or when a delay to get estimates from RS within a group cannot be accepted, this solution can still be used to improve the channel estimation of later symbols. Continuing from the example above in relation to FIG. 7, assume that we a set $A_1=\{S_1,S_2\}$. If we need early decoding then the base station can use the estimate, produced from $S_1$ to start decoding the first data symbols. However, for later symbols, it can estimate the channel using $S_2$ in combination with the estimate produced from $S_1$.

Figure 9:
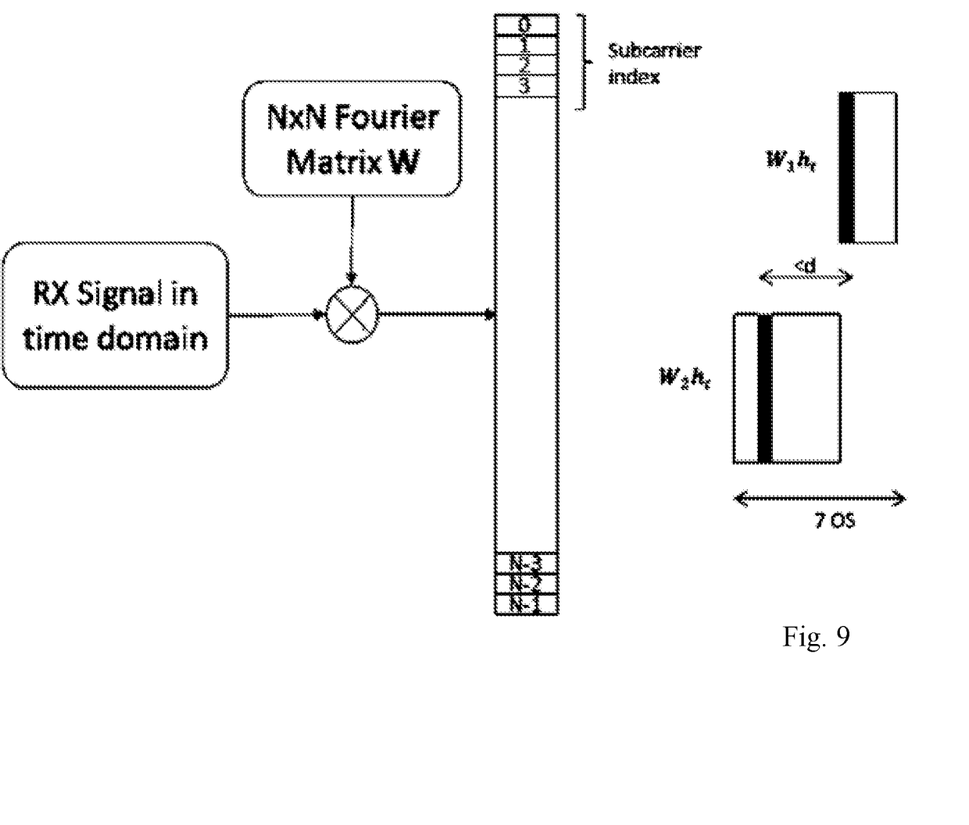
FIG. 9 is a diagram illustrating how the solution may be used when RS symbols are communicated on different frequencies, according to further examples.

This solution can be applied even if the RS sequences within a group $A_k$ are located on different frequencies. As long as they correspond to the same link then the channel length, i.e., number of taps, should be the same, assuming that the underlying channel that filters the intra-group RS signals is the same as shown in FIG. 9. This figure illustrates transmission from/to the same UE in mini-slots, over two different frequencies. Since the RS symbols are separated with a distance less than d, and the channel does not change, the RS sequences from the different resources units can be combined.

Figure 10:
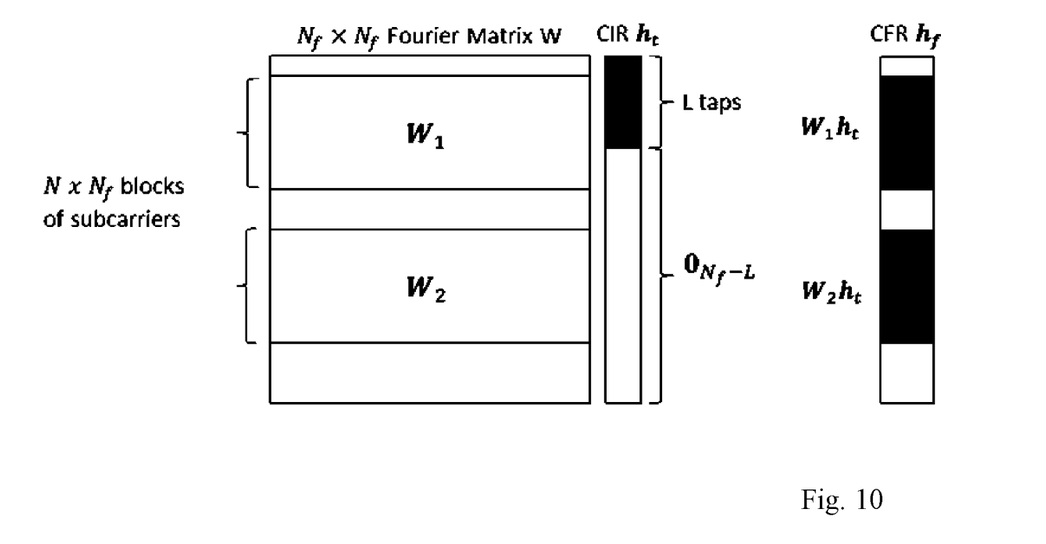
FIG. 10 is a diagram illustrating how RS symbols may be communicated in two different blocks of subcarriers, according to further examples.

What differs is the frequency placement, which is the application of a different block $W_k$ of the Fourier transform matrix. However, fundamentally the channel is the same, as can be seen in FIG. 10, where the channel spectrum in the different frequencies is defined by the block $W_k$ that is applied on the CIR $h_t$. This figure illustrates blocks W1 and W2 of a Fourier transform matrix, that corresponds to assigned bandwidth. As long as N>L, each block can be used to recover the channel impulse response.

The channel has at most L taps, and typically it holds that $L \gg N_f$, where $N_f$ is the size of the Discrete Fourier transform. Therefore, the same information about the channel can be recovered from different chunks of the time-frequency resource grid. Therefore, combining the metrics from RS sequences, that are placed on different OFDM symbols and bands, should be possible.

While the solution has been described with reference to specific exemplifying embodiments, the description is generally only intended to illustrate the inventive concept and should not be taken as limiting the scope of the solution. For example, the terms "receiving node", "transmitting node", "RS symbol", "hypothesis channel window length", "noise statistics" and "hypothesis noise window" have been used throughout this disclosure, although any other corresponding entities, functions, and/or parameters could also be used having the features and characteristics described here. The solution is defined by the appended claims.

The invention claimed is:

1. A method performed by a receiving node for determining a channel window length (l^) for a transformed domain channel estimator, the channel window length (l^) to be applied for a particular reference signal, RS, carrying symbol, the method comprising:

obtaining at least two subsets $(A_1, A_2, \ldots)$ of RS carrying symbols out of a set of RS carrying symbols $(\{S_1, S_2, \ldots\})$ received at the receiving node, the particular RS carrying symbol being comprised in at least one of the at least two subsets $(A_1, A_2, \ldots)$ of RS carrying symbols;

determining, for the at least one of the at least two subsets $(A_1, A_2, \ldots)$ of RS carrying symbols, a corresponding hypothesis channel window length (l*) based on a set of channel responses, each channel response in said set of channel responses corresponding to a respective RS carrying symbol of said at least one of the at least two subsets $(A_1, A_2, \ldots)$ of RS carrying symbols, determining the corresponding hypothesis channel window length (l*) for the at least one of the at least two subsets (A1, A2, ...) of RS carrying symbols performed by:

1) calculating a likelihood of each hypothesis channel window length (l) in a set of hypothesis channel window lengths based on samples, taken in the RS carrying symbols comprised in the at least one of the at least two subsets (A1, A2, ...) of RS carrying symbols, within the respective hypothesis channel window length (l), and 2) selecting, as the corresponding hypothesis channel window length (l*) for the at least one of the at least two subsets (A1, A2, ...) of RS carrying symbols, the hypothesis channel window length with highest likelihood, out of the set of hypothesis channel window lengths; and determining the channel window length (l^) for the particular RS carrying symbol comprised in the at least one of the at least two subsets $(A_1, A_2, \ldots)$ of RS carrying symbols based on the determined corresponding hypothesis channel window length (l*).

2. The method according to claim 1, further comprising: performing channel estimation for the particular RS carrying symbol based on L samples in the frequency domain taken in the particular RS carrying symbol within the determined channel window length (l^).

3. The method according to claim 1, wherein the likelihood of each hypothesis channel window length (l) in the set of hypothesis channel window lengths is calculated as $P(l)=f(y(S_1), y(S_2), \ldots, l)$, where $y(S_1), y(S_2) \ldots$ denote sample sequences taken in respective RS carrying symbols $(S_1, S_2, \ldots)$ for the hypothesis channel window length (l) and $f(y(S_1), y(S_2), \ldots, l)$ denotes a likelihood function based on the RS carrying symbols, out of the set of RS carrying symbols $(\{S_1, S_2, \ldots\})$, comprised in the at least one of the at least two subsets $(A_1, A_2, \ldots)$ of RS carrying symbols.

4. The method according to claim 3, wherein the likelihood function $f(y(S_1), y(S_2), \ldots, l)$ is calculated by first calculating an average sample sequence as $y(S_1, S_2 \ldots S_n)=1/n [y(S_1)+y(S_2)+\ldots+y(S_n)]$, and then calculating the likelihood $f(y(S_1), y(S_2) \ldots y(S_n), l)$ of the hypothesis channel window length (l) based on the average sample sequence $y(S_1, S_2 \ldots S_n)$.

5. The method according to claim 3, wherein the likelihood function $f(y(S_1), y(S_2) \ldots, l)$ is calculated by first calculating a log-likelihood of the hypothesis channel window length (l) for each RS symbol separately as $f(y(S_1), l), f(y(S_2), l) \ldots f(y(S_n), l)$, respectively, and then calculating a joint likelihood of the hypothesis channel window length (l) as $f(y(S_1), y(S_2) \ldots y(S_n), l)=f(y(S_1), l)+f(y(S_2), l)+\ldots f(y(S_n), l)$.

6. The method according to claim 1, wherein the particular RS carrying symbol is comprised in more than one of the obtained at least two subsets ($A_1, A_2, \ldots$) of RS carrying symbols, and wherein the channel window length ($\hat{l}$) for said particular RS carrying symbol is determined as an average of respective corresponding hypothesis channel window lengths ($l^*$) determined for each of the more than one of the obtained at least two subsets ($A_1, A_2, \ldots$) of RS carrying symbols.

7. The method according to claim 1, wherein noise statistics related to at least one of noise mean and noise variance are estimated for the RS carrying symbols in the received set of RS carrying symbols ($\{S_1, S_2, \ldots\}$), and wherein the estimated noise statistics are used for calculating the likelihood of each hypothesis channel window length (l) in the set of hypothesis channel window lengths.

8. The method according to claim 7, wherein the noise statistics are estimated using averaging over samples within a hypothesis noise window for RS carrying symbols in two or more of said obtained at least two subsets (A1, A2, ...) of RS carrying symbols, or by estimating the noise mean and/or noise variance in each of the at least two subsets (A1, A2, ...) of RS carrying symbols over samples within the hypothesis noise window on each received RS carrying symbol in the respective one of the at least two subsets (A1, A2, ...) of RS carrying symbols.

9. The method according to claim 1, wherein the separation of RS carrying symbols in each one of the obtained at least two subsets (A1, A2, ...) of RS carrying symbols does not exceed a specified number of symbols (d).

10. The method according to claim 9, wherein the specified number of symbols (d) is based on at least one of: slot format of the RS, carrier frequency of the RS, a subcarrier spacing used for transmission of the RS, relative speed between the receiving node and a transmitting node, and a precoder applied to the RS.

11. The method according to claim 1, wherein the method is performed in a transformed domain achieved by Fast Fourier Transform, FFT, or Discrete Cosine Transform, DCT, or any other invertible transform.

12. The method according to claim 1, wherein the RS carrying symbols are Orthogonal Frequency-Division Multiplexing, OFDM, symbols.

13. A receiving node arranged to determine a channel window length ($\hat{l}$) for a transformed domain channel estimator, the channel window length ($\hat{l}$) to be applied for a particular reference signal, RS, carrying symbol, the receiving node configured to:
   obtain at least two subsets ($A_1, A_2, \ldots$) of RS carrying symbols out of a set of RS carrying symbols ($\{S_1, S_2, \ldots\}$) received at the receiving node, the particular RS carrying symbol being comprised in at least one of the at least two subsets ($A_1, A_2, \ldots$) of RS carrying symbols;
   determine, for the at least one of the at least two subsets ($A_1, A_2, \ldots$) of RS carrying symbols, a corresponding hypothesis channel window length ($l^*$) based on a set of channel responses, each channel response in said set of channel responses corresponding to a respective RS carrying symbol of said at least one of the at least two subsets ($A_1, A_2, \ldots$) of RS carrying symbols, determining the corresponding hypothesis channel window length ($l^*$) for the at least one of the at least two subsets (A1, A2, ...) of RS carrying symbols performed by:
   1) calculating a likelihood of each hypothesis channel window length (l) in a set of hypothesis channel window lengths based on samples, taken in the RS carrying symbols comprised in the at least one of the at least two subsets (A1, A2, ...) of RS carrying symbols, within the respective hypothesis channel window length (l), and 2) selecting, as the corresponding hypothesis channel window length ($l^*$) for the at least one of the at least two subsets (A1, A2, ...) of RS carrying symbols, the hypothesis channel window length with highest likelihood, out of the set of hypothesis channel window lengths; and
   determine the channel window length ($\hat{l}$) for the particular RS carrying symbol comprised in the at least one of the at least two subsets ($A_1, A_2, \ldots$) of RS carrying symbols based on the determined corresponding hypothesis channel window length ($l^*$).

14. The receiving node according to claim 13, wherein the receiving node is further configured to:
   perform channel estimation for the particular RS carrying symbol based on L samples in the frequency domain taken in the particular RS carrying symbol within the determined channel window length ($\hat{l}$).

15. The receiving node according to claim 13, wherein the receiving node is configured to calculate the likelihood of each hypothesis channel window length (l) in the set of hypothesis channel window lengths as $P(l) = f(y(S_1), y(S_2), \ldots, l)$, where $y(S_1), y(S_2) \ldots$ denote sample sequences taken in respective RS carrying symbols ($S_1, S_2, \ldots$) for the hypothesis channel window length (l) and $f(y(S_1), y(S_2), \ldots, l)$ denotes a likelihood function based on the RS carrying symbols, out of the set of RS carrying symbols ($\{S_1, S_2, \ldots\}$), comprised in the at least one of the at least two subsets ($A_1, A_2, \ldots$) of RS carrying symbols.

16. The receiving node according to claim 15, wherein the receiving node is configured to calculate the likelihood function $f(y(S_1), y(S_2), \ldots, l)$ by first calculating an average sample sequence as $y(S_1, S_2 \ldots S_n) = 1/n [y(S_1) + y(S_2) + \ldots + y(S_n)]$, and then calculating the likelihood $f(y(S_1), y(S_2) \ldots y(S_n), l)$ of the hypothesis channel window length (l) based on the average sample sequence $y(S_1, S_2 \ldots S_n)$.

17. The receiving node according to claim 15, wherein the receiving node is configured to calculate the likelihood function $f(y(S_1), y(S_2) \ldots, l)$ by first calculating a log-likelihood of the hypothesis channel window length (l) for each RS symbol separately as $f(y(S_1), l), f(y(S_2), l) \ldots f(y(S_n), l)$, respectively, and then calculating a joint likelihood of the hypothesis channel window length (l) as $f(y(S_1), y(S_2) \ldots y(S_n), l) = f(y(S_1), l) + f(y(S_2), l) + \ldots f(y(S_n), l)$.

18. The receiving node according to claim 13, wherein the particular RS carrying symbol is comprised in more than one of the obtained at least two subsets ($A_1, A_2, \ldots$) of RS carrying symbols, and wherein the receiving node is configured to determine the channel window length ($\hat{l}$) for said particular RS carrying symbol as an average of respective corresponding hypothesis channel window lengths ($l^*$) determined for each of the more than one of the obtained at least two subsets ($A_1, A_2, \ldots$) of RS carrying symbols.

* * * * *